US012223395B2

United States Patent
Quiñones et al.

(10) Patent No.: US 12,223,395 B2
(45) Date of Patent: Feb. 11, 2025

(54) CIRCUIT CUTTING TAKING INTO ACCOUNT TRANSPILATION ERROR

(71) Applicant: Dell Products L.P., Round Rock, TX (US)

(72) Inventors: Miguel Paredes Quiñones, Campinas (BR); Rômulo Teixeira de Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 18/345,173

(22) Filed: Jun. 30, 2023

(65) Prior Publication Data

US 2024/0160990 A1 May 16, 2024

Related U.S. Application Data

(60) Provisional application No. 63/383,315, filed on Nov. 11, 2022.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ........ G06N 10/70; G06N 10/20; G06N 10/00; G06N 20/00; G06N 5/01
See application file for complete search history.

(56) References Cited

U.S. PATENT DOCUMENTS

2019/0378047 A1* 12/2019 Pistoia ................. G06F 17/14
2024/0152790 A1* 5/2024 Huffman ............... G06N 10/00

OTHER PUBLICATIONS

"A Dataset for Quantum Circuit Mapping | Elsevier Enhanced Reader." Accessed May 3, 2022. https://doi.org/10.1016/.dib.2021.107526.
Acampora, Giovanni, and Roberto Schiattarella. "Deep Neural Networks for Quantum Circuit Mapping." Neural Computing and Applications 33, No. 20 (Oct. 1, 2021): 13723-43. https://doi.org/10.1007/s00521-021-06009-3.
Jang, et al., Quantum Gate Pattern Recognition and Circuit Optimization for Scientific Applications, EPJ Web of Conferences 251 (2021): 03023, https://doi.org/10.1051/epjconf/202125103023.
Paler, Alexandru, Lucian M. Sasu, Adrian Florea, and Razvan Andonie. "Machine Learning Optimization of Quantum Circuit Layouts." ArXiv:2007.14608 [Quant-Ph], Jul. 29, 2020. http://arxiv.org/abs/2007.14608.

(Continued)

*Primary Examiner* — Matthew M Kim
*Assistant Examiner* — Matthew N Putaraksa
(74) *Attorney, Agent, or Firm* — Workman Nydegger

(57) ABSTRACT

Cutting quantum circuits is disclosed. Solutions to a cutting problem of cutting a quantum circuit into quantum subcircuits are represented in a tree structure. Selected nodes are queried using a machine learning model to generate predicted transpilation metrics such as estimated transpilation error. If the prediction associated with a node fails such that the predicted transpilation error in a simulated quantum computing system is greater than an error threshold or constraint, the corresponding solutions represented by the node and the node's children are pruned from the tree structure.

20 Claims, 6 Drawing Sheets

(56) References Cited

OTHER PUBLICATIONS

Salm, Marie, Johanna Barzen, Uwe Breitenbucher, Frank Leymann, Benjamin Weder, and Karoline Wild. "The NISQ Analyzer: Automating the Selection of Quantum Computers for Quantum Algorithms." In Service-Oriented Computing, edited by Schahram Dustdar, 1310:66-85. Communications in Computer and Information Science. Cham: Springer International Publishing, 2020. hllps://doi.org/10.1007/978-3-030-64846-6_5.

Teixeira De Abreu Pinho, et al., Transpilation-oriented decisions in hybrid quantum-classic workload orchestration, U.S. Appl. No. 18/054,565, filed Nov. 11, 2022.

Transpiler (qiskit.transpiler), https://qiskit.org/documentation/apidoc/transpiler.html (accessed Jun. 2022).

Wilson, Ellis, Sudhakar Singh, and Frank Mueller. "Just-in-Time Quantum Circuit Transpilation Reduces Noise." ArXiv:2005.12820 [Quant-Ph]. May 26, 2020. http://arxiv.org/abs/2005.12820.

Zhou, et al., Supervised Learning Enhanced Quantum Circuit Transformation, arXiv, Jan. 27, 2022, http://arxiv.org/abs/2110.03057.

Childs, Andrew M, Eddie Schoute, and Cem M Unsal. "Circuit Transformations for Quantum Architectures," n.d., 29.

\* cited by examiner

CIRCUIT CUTTING TAKING INTO ACCOUNT TRANSPILATION ERROR

RELATED APPLICATION

This application is related to U.S. Ser. No. 18/054,565 filed Nov. 11, 2022, and entitled TRANSPILATION-ORIENTED DECISIONS IN HYBRID QUANTUM-CLASSIC WORKLOAD ORCHESTRATION, which application is incorporated by reference in its entirety.

FIELD OF THE INVENTION

Embodiments of the present invention generally relate to quantum computing and to orchestrating quantum workloads. More particularly, at least some embodiments of the invention relate to systems, hardware, software, computer-readable media, and methods for cutting quantum circuits while accounting for transpilation error.

BACKGROUND

Executing quantum circuits in quantum computing systems can be both complicated and time consuming for a variety of different reasons. For example, the quantum circuit may be too large for available quantum hardware. Further, even if the necessary quantum hardware exists, the quantum circuit may need to wait until the resources are free.

More specifically, several difficulties exist with regard to quantum computing. When using real quantum hardware, the number of qubits is often limiting and, from a practical perspective, cannot execute quantum circuits with more qubits. Further, larger quantum hardware (comparatively more qubits) may be less accurate compared to quantum hardware with fewer qubits.

There are also problems associated with simulated quantum systems. As the complexity of a quantum circuit increases (e.g., more qubits required), the amount of resources required in the simulated quantum system increases exponentially. These issues complicate the ability to effectively and efficiently use quantum computing systems, whether real or simulated.

Further, executing the quantum circuit in a quantum computing system is preceded and/or followed by various operations that may also consume substantial amounts of computing resources and time. For example, prior to executing a quantum circuit, a cutting operation may be performed to cut the quantum circuit into smaller quantum circuits. When the cutting operation is performed, a knitting operation is necessary to knit the results of the various executions together to determine a result for the original quantum circuit.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
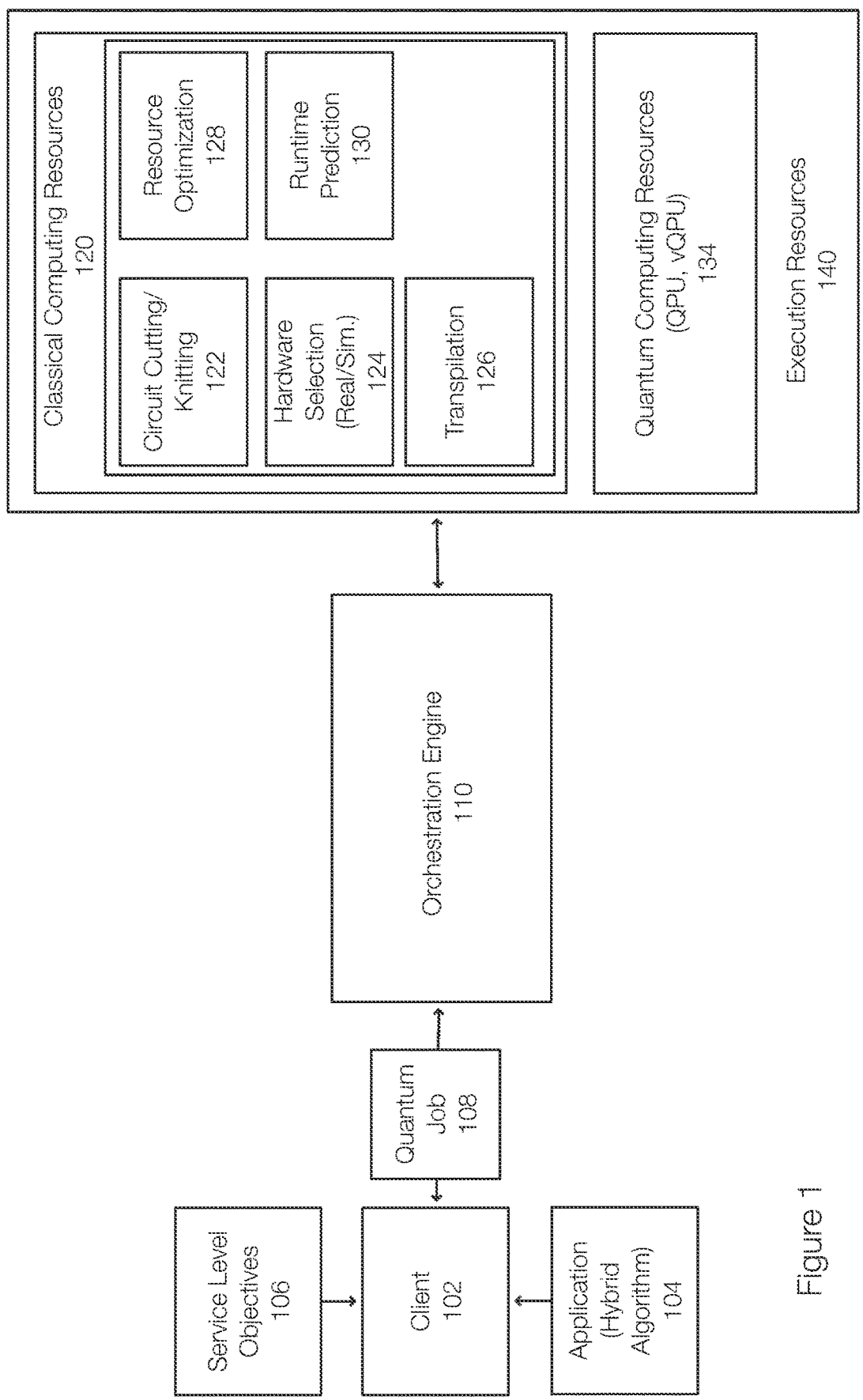
FIG. 1 discloses aspects of orchestrating the execution of quantum jobs and of executing quantum jobs.

Embodiments of the present invention generally relate to real and/or simulated quantum computing systems and to operations performed when executing quantum workloads. More particularly, at least some embodiments of the invention relate to systems, hardware, software, computer-readable media, and methods for orchestrating quantum jobs (i.e., quantum workloads) that may include quantum circuit(s). More specifically, embodiments of the invention relate to cutting quantum circuits into quantum subcircuits (each a quantum circuit on its own) in a manner that accounts transpilation operations and/or transpilation errors. Quantum circuits may be executed in simulated quantum systems (e.g., virtual quantum systems or units (vQPUs)) that include classical computing components (e.g., processors, memory) or real quantum hardware systems or units (QPUs).

The execution of quantum jobs often requires both classical computing systems and quantum computing systems because several operations are performed. Some of the operations are performed in classical computing systems and some of the operations are performed in quantum computing systems, whether real or simulated. Embodiments of the invention relate to orchestrating the operations performed in classical computing systems and in quantum computing systems.

Quantum computers or systems have limitations on the depth of the quantum circuit and the number of qubits that can be accommodated. Circuit cutting is an orchestration task or operation that is performed when a quantum circuit cannot run on a quantum system, whether real or virtual. The cutting operation allows the execution of large quantum circuits across different quantum systems. More specifically, the cutting operation allows multiple quantum hardware and/or simulation engines (QPUs and vQPUs) to execute large quantum circuits by cutting the original quantum circuit into smaller quantum circuits (quantum subcircuits). The quantum subcircuits can be executed sequentially on a particular quantum computing system, in parallel using multiple quantum computing systems, or combinations thereof.

In one example, a quantum job, which includes a quantum circuit, may be received at an orchestration engine that is configured to orchestrate the execution of the quantum job. Orchestrating the execution of the quantum circuit includes performing actions or operations such as, but not limited to, transpilation operations, cutting operations, and knitting operations. These operations are orchestrated as necessary and in the appropriate order.

Transpilation or a transpilation operation is the process of converting the quantum circuit received by the orchestration engine into a circuit that matches the topology of a target quantum system. Circuit cutting or a cutting operation is the process of dividing a quantum circuit into smaller quantum circuits or subcircuits. Circuit cutting provides several benefits. As previously stated, the amount of classical computing resources required to simulate a quantum system increases exponentially as the size of the quantum circuit increases. Because the quantum subcircuits are smaller, the amount of resources required to execute a smaller circuit is decreased.

Cutting a quantum circuit is a combinatorial problem (the cutting problem) that scales exponentially and is performed using classical computing resources. Cutting algorithms or operations may be implemented via optimization heuristics that aim to find good solutions for cutting the circuit by optimizing to some metric of quality. Because the cutting problem is solved via classic computation on classical infrastructure, enabling more efficient execution of cutting operations improves the overall quantum job orchestration process.

Circuit cutting may consider, by way of example, characteristics of the quantum circuit to be cut and the maximum number of qubits (i.e., circuit size) that can be accommodated on target quantum computing systems. The cutting operation is enriched if some additional characteristics of the quantum circuit are included, such as the associated post-transpilation circuit error, to choose the best or better cutting configuration.

Because the quantum subcircuits require transpilation, embodiments of the invention consider the cost of the transpilation operation when considering or performing a cutting operation. The cost of the transpilation operation may be represented or reflected in the transpilation error.

Embodiments of the invention thus account for transpilation in the context of cutting operations. A transpilation operation optimizes or converts a quantum circuit to run on a specific quantum computing system by transforming a representation of the quantum circuit into one that adheres to the topological constraints of the target quantum computing system. One of the purposes of the transpilation operation is to increase the fidelity of executing the quantum circuit on the target quantum computing system.

Embodiments of the invention include or account for, in the circuit cutting operation, the transpilation error (and/or the post-transpilation error or the error introduced by transpiling a quantum circuit) associated with quantum subcircuits allocated on target quantum computing systems. An oracle that contains the estimation of the transpiled quantum circuit's error can be used as a criterion for pruning solutions of the circuit cutting problem in a tree search algorithm.

More specifically, one aspect of the cutting operation considered in embodiments of the invention is cost, which may be expressed in terms of required computing resources, error, and/or time in one example. Because the cutting operation has an impact on transpilation, embodiments of the invention consider the cost of transpilation when performing the cutting operation.

Although post-transpilation metrics such as the resulting circuit depth and associated noise can be obtained relatively easily if calibration data from the target quantum hardware is available, running the transpilation process for every possible solution to a cutting problem is impractical and prohibitive.

When orchestrating the execution of quantum circuits, attempts to optimize some of these quantum related operations (e.g., transpilation, cutting, knitting) may generate conflicts. For example, knitting operations become complex and resource intensive as the number of circuits to be knit together increase. As a consequence, one aspect of optimizing knitting operations is to reduce the number of quantum subcircuits to be knitted together. In contrast to optimizing knitting operations, increasing the number of quantum subcircuits is beneficial for cutting operations because smaller quantum subcircuits consume or require fewer computing resources.

Embodiments of the invention more specifically relate to orchestrating the execution of a quantum circuit and more specifically to orchestrating and/or performing cutting operations in a manner that considers the transpilation operation and, in one example, estimated transpilation errors.

Embodiments of the invention relate to performing a cutting operation or aspects of a cutting operation by accounting for transpilation errors associated with a given solution to the cutting problem. In one example, the potential solutions of the cutting problem may be represented as a tree, where each node of the tree represents a solution to the cutting problem. Using a branch and bound approach, solutions and solutions derived therefrom that are not satisfactory (e.g., do not satisfy error threshold levels) may be pruned from the graph or tree. This can substantially reduce the potential solutions to the cutting problem and reduce the resources and time required to identify a suitable solution to the cutting problem.

More specifically, a given solution to the cutting problem can be input to a machine learning model to predict the transpilation error associated with the solution. If the prediction is above an error threshold, the solution fails and may be pruned from the solution tree.

FIG. 1 discloses aspects of orchestrating a quantum job. In one example, a quantum job may be generated by a hybrid application 104. The hybrid application 104 is an application that may require the use of both classical computing resources 120 and quantum computing resources 134. The orchestration of the quantum job may be performed by an orchestration engine and as previously stated, some aspects of the quantum job may be executed in classical computing systems and other aspects may be executed in quantum environments (simulated or real). When quantum computing resources are required, the hybrid application 104 may generate and submit a quantum job 108 to the orchestration engine 110. Results of executing the quantum job may be returned to the client 102. Other aspects of the hybrid application 104 that do not require quantum computing may be performed in classical computing systems with or without the aid of the orchestration engine.

In FIG. 1, a client 102 (e.g., a computing device that may receive user input) may submit a quantum job 108, which may be associated with service level objectives 106 and a hybrid application 104, to an orchestration engine 110. The orchestration engine 110 is configured to orchestrate the execution of the quantum job 108 in accordance with the service level objectives 106.

The orchestration engine 110 may orchestrate the operations involved in executing the quantum job. The actions or operations orchestrated by the orchestration engine 110 may include circuit cutting/knitting 122 operations, resource optimization 128 operations, hardware selection 124 operation, runtime prediction 130 operations, transpilation 126 operations, or the like or combination thereof. The orchestration engine 110 may have access to execution resources 140, which may include the classical computing resources 120 (e.g., servers, nodes, containers, clusters, virtual machines) that include processors, memory, and the like. The execution resources 140 may also include the quantum computing resources 134 (real or simulated).

Orchestrating the execution of the quantum job 108 may include managing the stages of executing the quantum job. In effect, the orchestration engine 110 may guide the quantum job 108 through a quantum pipeline such that the output of each stage is directed to the input of the next stage. Examples of stages or operations that may be performed on a quantum job include cutting, transpilation, knitting, resource optimization, runtime prediction, or the like or combinations thereof.

Once the quantum circuit or quantum subcircuits are prepared for execution, these circuits are deployed to or placed in the quantum computing resources 134, which may be simulated or real. The results of executing the quantum circuits in the quantum computing resources 134 may also be collected by the orchestration engine 110 and returned to the client 102.

Figure 2:
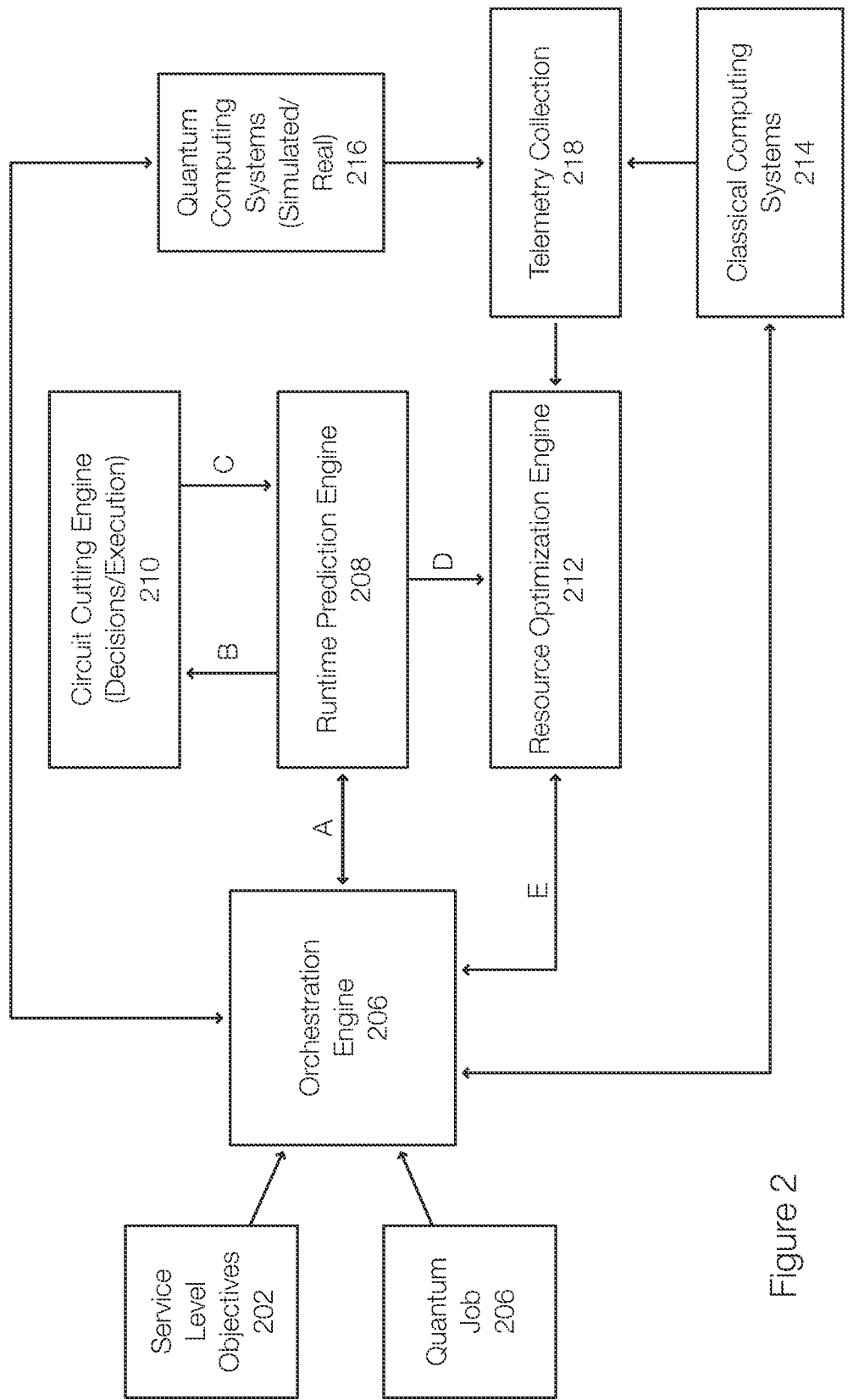
FIG. 2 discloses additional aspects of executing a quantum job.

FIG. 2 discloses aspects of orchestrating a quantum job. In FIG. 2, an orchestration engine 206 receives a quantum job 206 and/or associated service level objectives 202. At A, the orchestration engine 206 may submit an original quantum circuit included in the quantum job 206 to a runtime prediction engine 208.

The runtime prediction engine 208, in one embodiment, is representative of one or one or more machine learning models that are configured to predict or estimate runtime characteristics such as, but not limited to, resources required to execute the original quantum circuit in a simulated quantum system or a real quantum system, time required to execute the original quantum circuit in a simulated or real quantum system, or the like. If feasible, based on the runtime prediction, the original quantum circuit may simply be executed, which may avoid the cost of various operations including cutting operations and knitting operations.

The runtime prediction engine 208 may also represent, include, or have access to one or more machine learning models that are configured or trained to estimate various aspects of executing quantum circuits such as transpilation computing requirements, transpilation execution time, transpilation error or the like. The machine learning model or models included in the runtime prediction engine 208 may be trained using historical executions of quantum jobs in different types of simulated and/or real quantum computing systems. For example, a model trained to estimate or predict transpilation error or other transpilation metrics may be trained using appropriate historical executions.

At B, the original quantum circuit may be evaluated for cutting purposes. The circuit cutting engine 210 may also use the runtime prediction engine 208, which may also be configured to predict a success rate, resource consumption, and execution time related to a cutting operation. These predictions or estimates may be used in determining whether the quantum circuit should be cut or to optimize resources.

The circuit cutting engine 210 may be configured to cut the quantum circuit into smaller quantum subcircuits. The cutting problem may be reduced in size by eliminating some of the solutions to the cutting problem. Thus, the circuit cutting engine 210 may evaluate solutions using the runtime prediction engine 208 (or appropriate model thereof) to eliminate some of the solutions.

For example, the runtime prediction engine 208 generates output that can be used to determine whether there are enough resources to execute the original quantum circuit within the boundaries of the service level objectives 202. The circuit cutting engine 210 may generate an output that determines whether cutting the original quantum circuit may improve the overall system performance or service-level objectives.

If the quantum circuit is cut into quantum subcircuits, the runtime prediction engine 208 is used to generate estimated or predicted runtime characteristics for each of the quantum subcircuits, transpilation errors for each of the quantum subcircuits, or the like. In one embodiment, the predicted or estimated transpilation error may be used to eliminate solutions to the cutting problem. This reduces the cost by reducing the number of solutions and by removing the need to actually perform the transpilation process for each potential solution to the cutting problem.

At D, a resource optimization engine 212 performs resource optimization for either the original quantum circuit or, if the circuit was cut or is planned to be cut, for each of the resulting quantum subcircuits. Optimizing resources may be based, in part, on telemetry collection 218, which includes telemetry information collected from the quantum computing systems 216 and the classical computing systems 214, which are examples of the execution resources 140 used by the orchestration engine 206 when orchestrating the execution of a quantum job. The resource optimization engine 212 uses the collected telemetry data and the predicted runtime characteristics for the quantum circuit or for each of the quantum subcircuits to generate an execution plan at E. The orchestration engine 206 then performs or implements the execution plan that allows resources (e.g., the quantum computing systems 216 and/or classical computing systems 214) to be allocated/used in an intelligent manner that is based on runtime characteristics, which may include transpilation errors, of the quantum circuit or the quantum subcircuits, current telemetry data and/or service level objectives.

Figure 3:
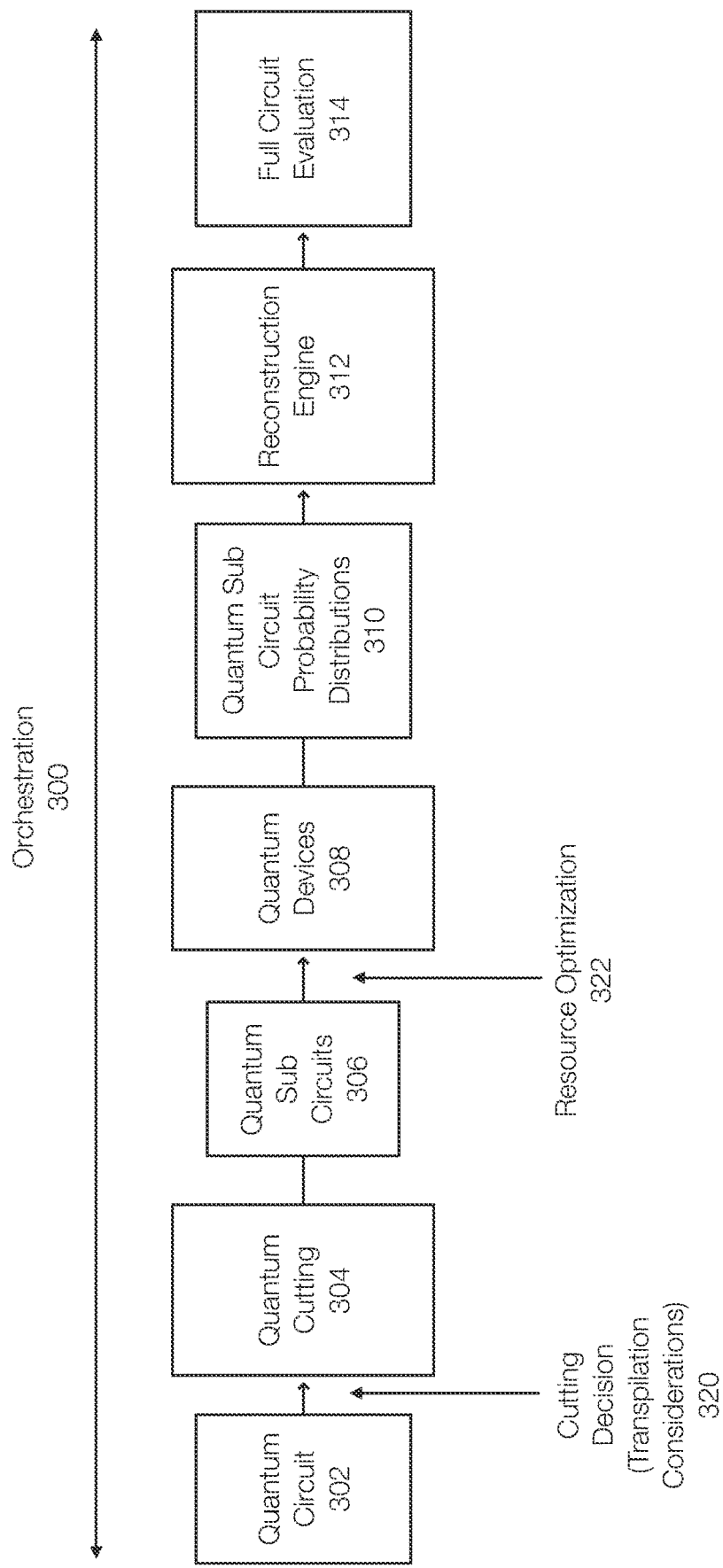
FIG. 3 discloses aspects of orchestrating the execution of quantum jobs in a manner that accounts for the impact of transpilation.

FIG. 3 discloses aspects of orchestrating the execution of a quantum circuit and illustrates examples of orchestration actions or operations. In FIG. 3, an orchestration engine performs orchestration 300 that may be performed from receipt of a quantum job or circuit to providing results of executing the quantum circuit. A quantum circuit 302 is provided to quantum cutting 304. When cutting the quantum circuit 302 at quantum cutting 304, a cutting decision 320 is performed that considers transpilation error.

The cutting decision 320 includes evaluating the solutions to the cutting problem on a tree structure or solution tree. This solution tree allows solutions to the cutting problem to be eliminated or pruned from the tree. For example, a node of the tree, which represents a solution, can be evaluated using the runtime prediction engine. The runtime prediction engine may be a machine learning model configured to predict or estimate the transpilation error associated with the quantum subcircuits of a solution to the cutting problem. If the estimate fails (the transpilation error is above an error threshold), the solution (a particular node in the tree or solution structure) and all solutions derived from that solution (the children nodes) can be pruned from the solution tree. Thus, the cutting operation is integrated with transpilation error predictions or estimates to reduce the number of solutions in the solution set.

In one example, the solutions in the tree are evaluated for execution in a simulated quantum computing system to determine or estimate the transpilation error. The solution of a node may represent multiple circuits or subcircuits. The solution is accepted or rejected based on the quantum subcircuit with the highest transpilation error in one embodiment. In one example, if the runtime prediction for one of the quantum subcircuits in a particular solution estimates or infers a transpilation error that is above a threshold level, the solution fails and may be pruned from the tree.

Once the tree is pruned, a solution is selected from the remaining solutions and a cutting operation is performed at 304. Cutting 304 the quantum circuit 302 generates quantum subcircuits 306 that are executed at quantum devices 308 (real or simulated). Once the quantum subcircuits 306 are generated, runtime prediction may be performed on each of the quantum subcircuits 306 such that resource optimization 322 can be performed. Once an execution plan is generated that reflects the resource optimization, the quantum subcircuits 306 are submitted to the quantum devices 308 (real and/or simulated) in accordance with the execution plan. The outputs of the executions may include quantum subcircuit probability distributions 310.

Executing a quantum circuit is often performed by executing the circuit in a quantum device for a predetermined number of shots. The output is a collection of shot results which reflect an underlying probability distribution. Thus, the outputs of executing the quantum subcircuits includes the probability distributions 310.

Next, a knitting operation is performed by a reconstruction engine 312. The reconstruction engine 312 combines the outputs (e.g., the various probability distributions) of executing the quantum subcircuits 306 to determine the output (the probability distribution) of the original quantum circuit 302. This allows an evaluation 314 of the full or original quantum circuit to be performed. The results or evaluation can be returned to the client or to the hybrid application.

As previously stated, circuit cutting can be viewed as a combinatorial optimization problem that seeks to minimize the computational burden of postprocessing the cuts or of post processing (e.g., knitting the results). Quantum circuits can be represented as directional acyclic graph (DAG), where vertices correspond to gates (operations) and directed edges correspond to qubit dependencies. Variables on circuit cutting can be formulated in the following way:

$$y_{v,c,h} = \begin{cases} 1 & \text{if vertex } v \text{ is in subcircuit } c \\ 0 & \text{otherwise} \end{cases} \text{ and}$$

$$z_{e,c,h} = \begin{cases} 1 & \text{if edge } e \text{ is cut by subcircuit } c \\ 0 & \text{otherwise} \end{cases}.$$

Where v is the vertex of the DAG, $e=(v_i, v_o)$ is an edge or the qubit wire that links $v_i$ and $v_o$, and h is the target quantum system or hardware.

One technique for solving combinatorial problems is branch and bound, where solutions to a combinatorial problem are evaluated on a tree structure. A solution tree allows all solutions derived from a poor or unsatisfactory solution to be pruned from the tree in an efficient way. The quality of each candidate solution, x, is obtained via an objective function $f(x)$. If a search on a branch and bound scheme is performed where every node is characterized by the fixation of, for example, a variable $y_{v,c,h}$ in 1 or 0, a smaller optimization problem can be solved at every node of the branch and bound tree.

In the context of a cutting operation, $f(x_i)$ is related to the cost of post-processing (e.g., knitting) the subcircuits represented by candidate solution $x_i$. In one example, $f(x_i)$ also considers the post-transpilation error on the target quantum system (quantum hardware h (simulated or real)) associated with each quantum subcircuit present in $x_i$.

Instead of running a transpilation instance with all subcircuits in $x_i$, a machine learning method or model $M(x_{c,h})$ receives as input the subcircuit c and target hardware h in the variable $x_{c,h}$ and returns the expected transpiled error of the circuit, $\hat{\varepsilon}_{c,h}$.

In one embodiment, a pre-processing step extracts features of c, such as, by way of example, the number of CNOT gates between qubits, and of h, such as the topology (i.e., inter-connection) of the physical qubits on the target hardware. Those features are provided as input to M, which generates several transpilation-related metrics, including $\hat{\varepsilon}_{c,h}$, of a certain transpilation algorithm, t, targeted at h.

As stated above, $f(x_i)$ may combine $\hat{\varepsilon}_{c,h}$ with the knitting cost of a candidate solution $x_i$. However, this results in the aforementioned conflicting objectives to, at the same time, increase and decrease the number of sub-circuits in $x_i$. To address this, the assessment of $\hat{\varepsilon}_{c,h}$ is separated from $f(x_i)$ in some embodiments of the invention.

A maximum error $\varepsilon$ that serves as a constraint for the expected error during the transpilation of subcircuit c is determined. In one example, the constraint $\hat{\varepsilon}_{c,h} \leq \varepsilon$ is relaxed for the exploration of every node and verified at every d level of the nodes of the solution tree in one embodiment. In one example, the model M may not be executed for intermediate nodes, although this is not precluded. In some embodiments, the model M is only executed at certain selected nodes, thereby minimizing or reducing the computational burden of executing the model at every node.

If the explored node (or solution represented by the node) does not satisfy the error constraint, this node and all its children are pruned from the solution tree. In one embodiment, a backward verification may be done in intermediate nodes. If, in intermediate nodes, this constraint is also not attained, additional nodes may be pruned. In one embodiment, all variables related to the possibility of subcircuit c to be allocated in the target hardware is fixed to $y_{v,c}=0$. This is similar to the so called "lazy constraints" of combinatorial optimization problems.

Figure 4:
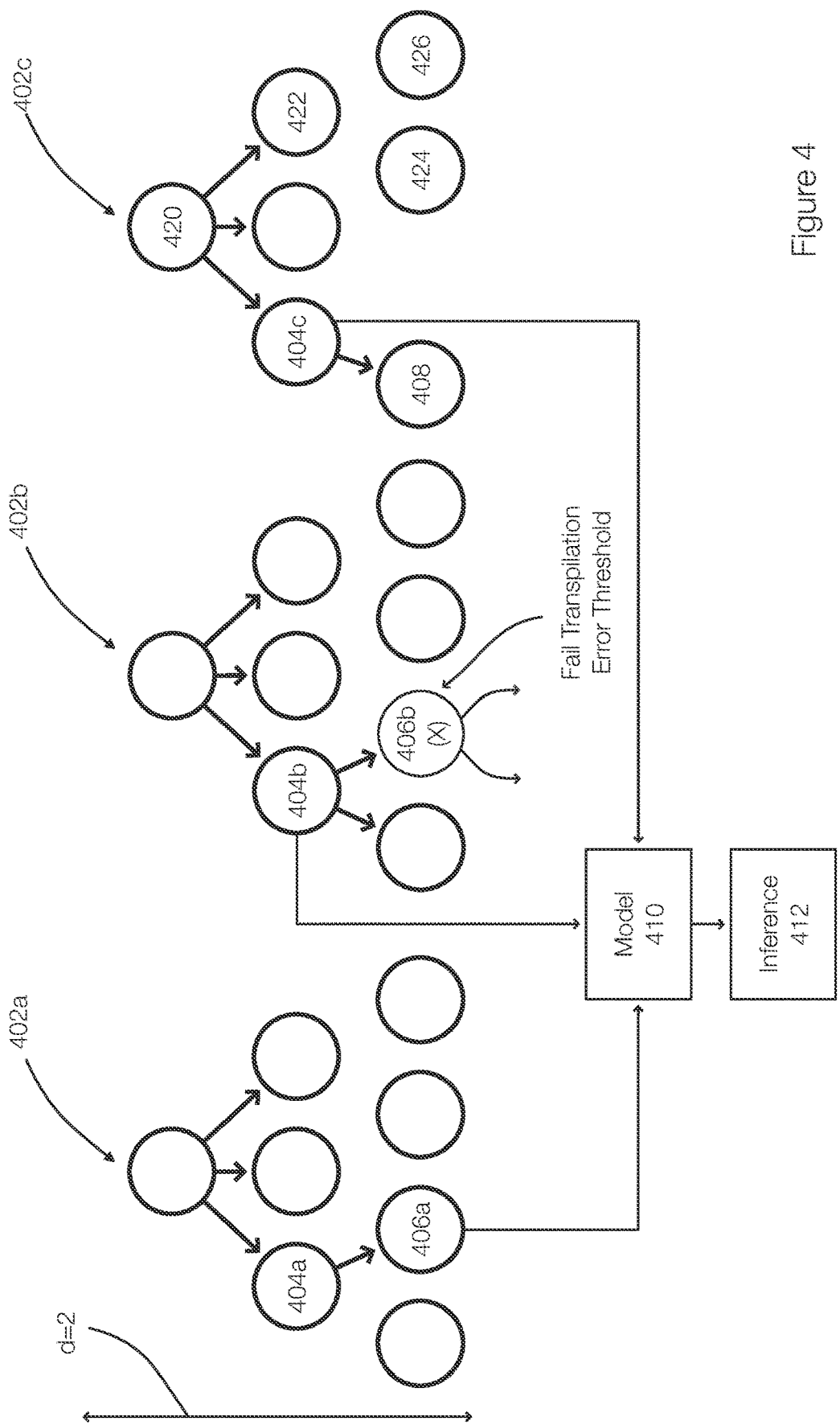
FIG. 4 discloses aspects of pruning solutions to a cutting problem based in part on an estimated transpilation error.

FIG. 4 discloses aspects of pruning a solution tree based on the estimated or predicted transpilation error. As shown in FIG. 4, for d=2, intermediate nodes may not execute model M, but this is not precluded. In one example embodiment, the model M is only executed at certain selected nodes, minimizing the computational burden of executing the model at every node. Then, if the explored node does not satisfy the error constraint, this node and all children of that node are pruned from the solution tree. In one embodiment, a backward verification may be performed. This may allow additional branches to be pruned more efficiently if the error constraint is not attained in intermediate nodes. All variables related to the possibility of the cutting configuration being allocated on the target quantum computing system may be fixed to $y_{v,c}=0$. This is similar to the so called "lazy constraints" of combinatorial optimization problems.

In the example of FIG. 4, a tree structure is illustrated at different stages represented by 402a, 402b, and 402c. In this example, the depth is d=2 and a node 406a is being evaluated. The node 406a corresponds to a particular solution of the cutting problem. The solution (or the quantum subcircuits or features thereof) and a target quantum computing system are provided to a model 410 as input and an inference 412 is generated. The inference 412 may include a predicted or estimated transpilation error in the target quantum computing system, which quantum computing system may be a simulated quantum computing system.

In one example, a query may be performed at the selected node $Q(M(x_i)|t)$. In this example, $x_i$ is the node 406b and $t$ is the target quantum computing system. The query determines whether the node passes or fails with respect to the maximum error or in the context of the error constraint. As illustrated in the stage 402b, the node 406a (now referenced as 406b) along with all children of the node 406b are pruned from the solution tree structure because the predicted transpilation error at the inference 412 for the solution of the node 406a was above a threshold error level.

At the stage 402c, a backward verification (e.g., a query) is performed at the node 404c. Thus, the solution (or its features) to the cutting problem represented by the node 404c is submitted to the model 410 and an inference 412 is generated. Stated differently, the query $Q(M(x_{i-1})|t)$ is performed. If the query fails (the inference 412 (or predicted transpilation error) is above a threshold level), the node 404c is pruned along with its children nodes including the node 408. If $Q(M(x_{i-1})|t)=$'pass', then the solution remains in the tree structure for consideration.

In one example, a solution may be evaluated for multiple quantum computing systems at least because the transpilation error may vary. However, if the target quantum computing system is predetermined, all inferences may be generated with respect to the target quantum computing system.

By way of example, the node 420 may represent an initial solution to a quantum circuit having 10 qubits. Thus, the solution of the node 420 is the quantum circuit. The node 422 may represent a solution that includes two quantum subcircuits (a cut) having 4 qubits and 6 qubits, respectively. If the nodes 424 and 426 are children of the node 422, the solution of the node 424 may include quantum circuits of 2, 2, and 6 qubits. The node 426 may represent a solution of quantum circuits with 4, 3, and 3 qubits.

If the solution of the node 422 is probed using the model 410 and the query fails, the node 422, 424, and 426 would be pruned from the tree structure. This reduces the set of solutions efficiently and allows the cutting solution to arrive at a specific cutting solution more quickly.

Embodiments of the invention thus include transpilation error estimation or inference into the cutting operation as a quality-related restriction. Using a machine learning model to prune solutions based on predicted transpilation errors improves the overall efficiency, accuracy, and execution time of the overall cutting operation. Further, embodiments of the invention separate the error constraint from the cutting optimization objective or other optimization, such as a knitting optimization, to avoid optimization conflicts.

Embodiments of the invention thus evaluate the transpilation error in the context of the cutting process as a quality-wise restriction: solutions that are unable to satisfy transpilation error constraints or requirements are removed from consideration. Thus, a machine learning model can be used while solving a combinatorial optimization problem such as cutting a quantum circuit to prune solutions to the cutting problem based on predicted or estimated transpilation errors. Further, the separation of the error constraint from the cutting optimization objective avoid conflicts in its formulation.

Some embodiments of the invention further relate to circuit cutting solutions that focus on or relate to the tasks or running the sub-circuits exclusively on quantum simulation engines. Plus, embodiments of the invention further use transpilation error predictions to eliminate candidate cutting solutions for simulation engines.

Figure 5:
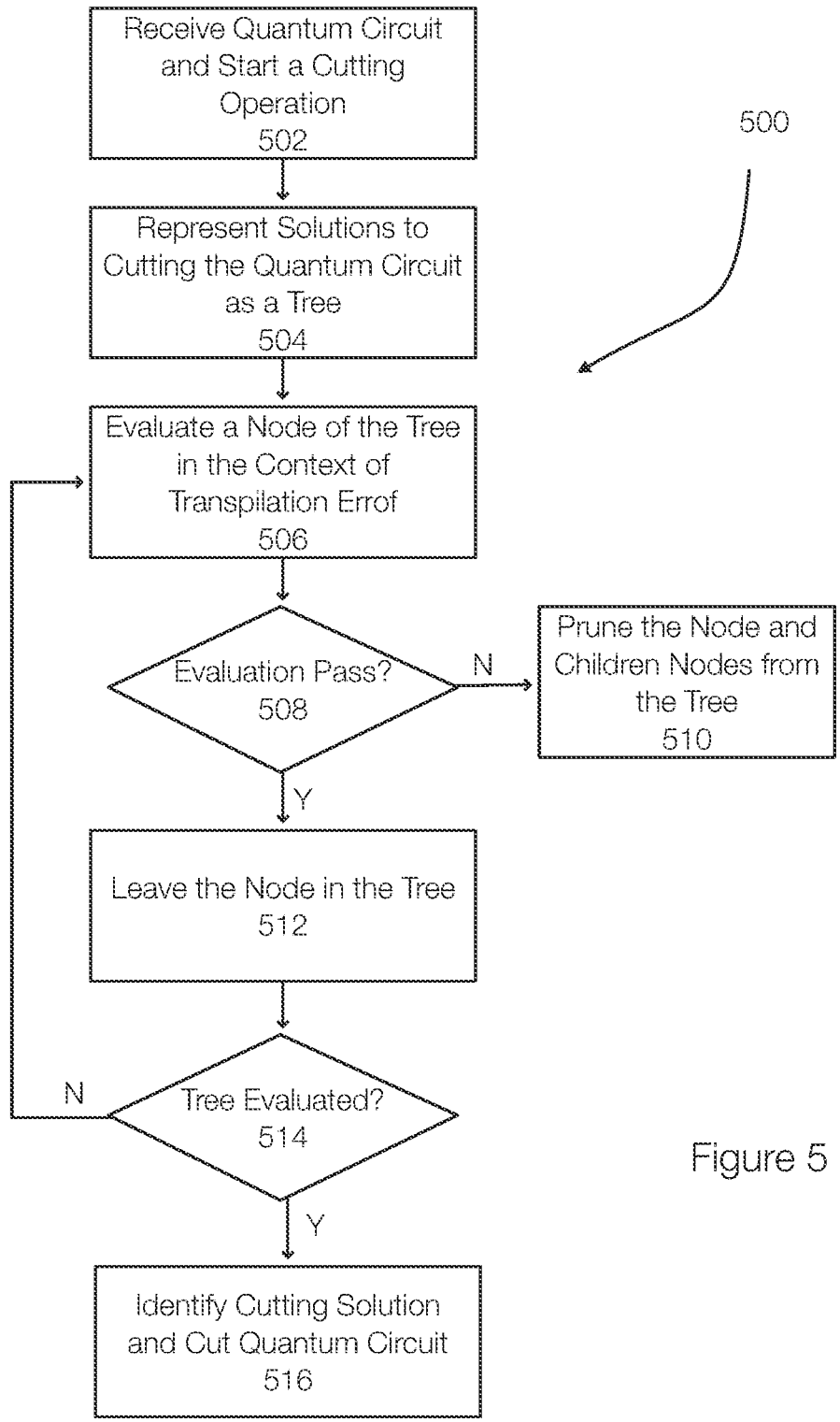
FIG. 5 discloses aspects of a method for performing a cutting operation while accounting for an estimated or predicted transpilation error.

FIG. 5 discloses aspects of a method for performing a cutting operation based on a quality restriction. The method 500 includes receiving a quantum circuit and initiates or starts 502 a cutting operation on the quantum circuit. As previously stated, performing the cutting operation may include solving or finding a suitable solution to a cutting problem. Stated differently, the cutting problem is a combinatorial optimization problem that can potentially consume a substantial amount of time and resources to solve. In the method 500, solutions to cutting the quantum circuit are represented 504 as a tree or solution tree structure.

Next, a node of the tree is selected and the solution represented by the selected node is evaluated 506 in the context of its predicted transpilation error. This allows the solution to be evaluated at least in terms of quality. Thus, the solution represented by the current or currently selected node of the tree is provided to a machine learning model that is trained and configured to estimate transpilation metrics, such as the transpilation error, and/or other metrics/characteristics. For example, a query that serves as a constraint may be executed. If the constraint or query passes, the node remains as a potential solution. If the constraint or query fails, the node and its children nodes are pruned or eliminated from the tree and are not considered as solutions to the cutting problem.

Thus, if the evaluation passes (the prediction of required resources and/or execution time is/are below a threshold value) (Y at 508), the node remains in the tree. If the evaluation or query of a node fails (N at 508), then the node and its children are pruned 510 from the tree.

If the nodes have been sufficiently evaluated (Y at 514), a solution is identified from among the solutions remaining the tree and the quantum circuit is cut 516 according to the solution. If the method 500 has more nodes or solutions to evaluate (N at 514), the method 500 selects another node and performs the evaluation or query.

Figure 6:
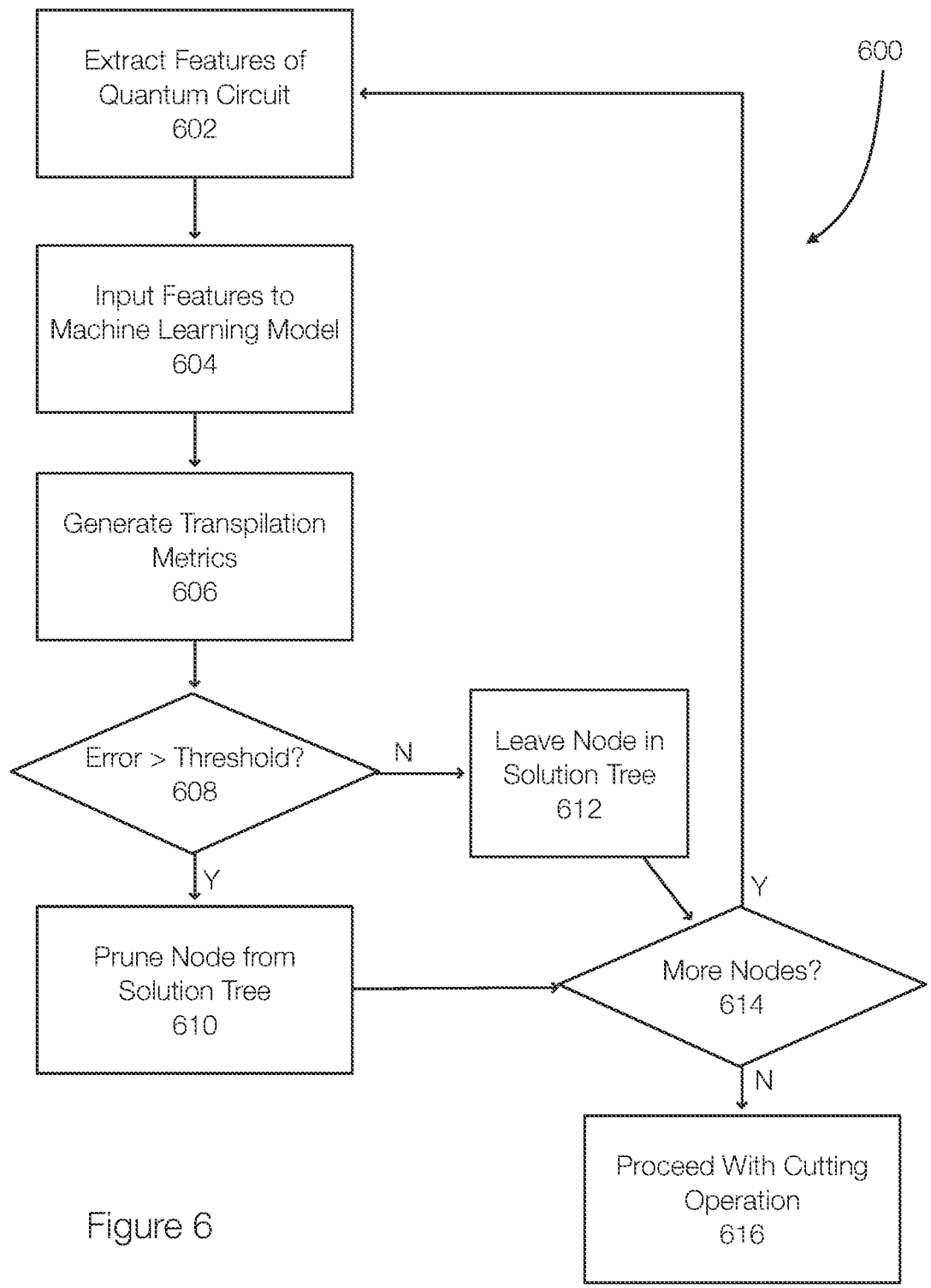
FIG. 6 discloses aspects of a method for performing a cutting operation that accounts for transpilation error.

FIG. 6 discloses aspects of accounting for transpilation error when cutting a quantum circuit into smaller quantum circuits. When evaluating a node of a solution tree that represents a solution to a cutting problem, the model may be invoked for each of the subcircuits in the solution.

In the method 600, features of a quantum circuit in the solution are extracted 602 and then input 604 to a model, along with a target quantum computing system in one example. The model may generate 606 or infer transpilation metrics, which may include a transpilation error.

If the transpilation error is greater than a threshold (Y at 608), the node and is children are pruned 610 from the tree. If the estimated transpilation error is less than the threshold error (N at 608), the node is not pruned, but remains 612 in the tree. If more nodes needed to be processed (Y at 614), the next node is selected and processed as illustrated in the method 600. If there are no more nodes or if a sufficient number of nodes have been processed (N at 614, the cutting operation proceeds 616. This may include identifying a solution from the remaining nodes and then cutting the quantum circuit accordingly.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, hybrid-classical application operations, quantum circuit operations, quantum circuit execution operations, quantum circuit cutting operations, resource consumption estimation operations, quantum circuit knitting operations, telemetry operations, machine learning model operations (e.g., that generate predictions or inferences) or the like or combination thereof. These operations may, in some examples, be referred to as quantum operations.

Example cloud computing environments, which may or may not be public, include storage environments that may provide functionality for one or more clients or systems. Another example of a cloud computing environment is one in which quantum operations and/or quantum services may be performed on behalf of one or more clients, applications, or users. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. The cloud environment may also include quantum environments including vQPUs, QPU, other accelerators, or the like.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data or circuits. Such clients may comprise physical machines, containers, or virtual machines (VMs).

Particularly, devices in the operating environment, such as classical components of hybrid classical-quantum systems, may take the form of software, physical machines, containers, or VMs, or any combination of these, though no particular device implementation or configuration is required for any embodiment. Similarly, data storage system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

It is noted that any operation(s) of any of these methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in anyway.

Embodiment 1. A method comprising: representing solutions to a cutting problem of cutting a quantum circuit into quantum subcircuits in a tree structure, wherein nodes of the tree structure correspond to solutions of the cutting problem, evaluating a solution associated with a selected node, performing a query on the solution to determine a predicted transpilation error for transpiling the quantum subcircuits represented by the solution, pruning the node from the tree structure when the predicted transpilation error is greater than a threshold transpilation error, and leaving the node in the tree structure when the query passes.

Embodiment 2. The method of embodiment 1, further comprising receiving a quantum circuit from a client.

Embodiment 3. The method of embodiment 1 and/or 2, further comprising inputting the solution, which includes a set of quantum subcircuits, into a machine learning model that is configured to predict the transpilation error for each of the quantum subcircuits in the set of quantum subcircuits.

Embodiment 4. The method of embodiment 1, 2, and/or 3, wherein the predicted transpilation error is compared to a threshold transpilation error, wherein the solution is rejected when the comparison fails, wherein the comparison fails when the predicted transpilation error is greater than the threshold transpilation error.

Embodiment 5. The method of embodiment 1, 2, 3, and/or 4, further comprising deleting the node associated with the solution and children nodes of the node associated with the solution from the tree structure.

Embodiment 6. The method of embodiment 1, 2, 3, 4, and/or 5, further comprising extracting features from the set of quantum subcircuits and inputting the features into the machine learning model.

Embodiment 7. The method of embodiment 1, 2, 3, 4, 5, and/or 6, wherein the query includes an error constraint relating to transpiling the set of quantum subcircuits.

Embodiment 8. The method of embodiment 1, 2, 3, 4, 5, 6, and/or 7, wherein less than all of the nodes in the tree structure are subject to the query.

Embodiment 9. The method of embodiment 1, 2, 3, 4, 5, 6, 7, and/or 8, further comprising performing a backward verification on a parent node of the selected node by performing a query on the parent node.

Embodiment 10. The method of embodiment 1, 2, 3, 4, 5, 6, 7, 8, and/or 9, further comprising, after an operation of pruning the tree is completed, selecting a solution and cutting the quantum circuit according to the solution to generate the quantum subcircuits, wherein finding a solution to the cutting problem is separate and independent of performing a knitting operation after the quantum circuits have been cut and executed at one or more quantum computing systems and wherein pruning is performed separate and independent of other operations to avoid conflicting optimizations.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-12.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent, may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, herein, may take the form of, or include, or be implemented on, or hosted by, a physical computing device, As well, where any of the aforementioned elements comprise or consist of a virtual machine (VM) or a container, that VM or container may constitute a virtualization of any combination of the physical components disclosed herein.

In a physical computing device includes a memory which may include one, some, or all, of random-access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein. The physical device may be an example of a classical computing system that may be part of a hybrid computing system. A quantum processing system or unit may also be included in the hybrid computing system.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
representing solutions to a cutting problem of cutting a quantum circuit into quantum subcircuits in a tree structure, wherein nodes of the tree structure correspond to solutions of the cutting problem;
evaluating a solution associated with a selected node;
performing a query on the solution to determine a predicted transpilation error for transpiling the quantum subcircuits represented by the solution;
pruning the node from the tree structure when the predicted transpilation error is greater than a threshold transpilation error; and
leaving the node in the tree structure when the query passes.

2. The method of claim 1, further comprising receiving a quantum circuit from a client.

3. The method of claim 1, further comprising inputting the solution, which includes a set of quantum subcircuits, into a machine learning model that is configured to predict the transpilation error for each of the quantum subcircuits in the set of quantum subcircuits.

4. The method of claim 3, wherein the predicted transpilation error is compared to a threshold transpilation error, wherein the solution is rejected when the comparison fails, wherein the comparison fails when the predicted transpilation error is greater than the threshold transpilation error.

5. The method of claim 4, further comprising deleting the node associated with the solution and children nodes of the node associated with the solution from the tree structure.

6. The method of claim 5, further comprising extracting features from the set of quantum subcircuits and inputting the features into the machine learning model.

7. The method of claim 3, wherein the query includes an error constraint relating to transpiling the set of quantum subcircuits.

8. The method of claim 1, wherein less than all of the nodes in the tree structure are subject to the query.

9. The method of claim 1, further comprising performing a backward verification on a parent node of the selected node by performing a query on the parent node.

10. The method of claim 1, further comprising, after an operation of pruning the tree is completed, selecting a solution and cutting the quantum circuit according to the solution to generate the quantum subcircuits, wherein finding a solution to the cutting problem is separate and independent of performing a knitting operation after the quantum circuits have been cut and executed at one or more quantum computing systems and wherein pruning is performed separate and independent of other operations to avoid conflicting optimizations.

11. A non-transitory storage medium having stored therein instructions that are executable by one or more hardware processors to perform operations comprising:
representing solutions to a cutting problem of cutting a quantum circuit into quantum subcircuits in a tree structure, wherein nodes of the tree structure correspond to solutions of the cutting problem;
evaluating a solution associated with a selected node;
performing a query on the solution to determine a predicted transpilation error for transpiling the quantum subcircuits represented by the solution;
pruning the node from the tree structure when the predicted transpilation error is greater than a threshold transpilation error; and
leaving the node in the tree structure when the query passes.

12. The non-transitory storage medium of claim 11, further comprising receiving a quantum circuit from a client.

13. The non-transitory storage medium of claim 11, further comprising inputting the solution, which includes a set of quantum subcircuits, into a machine learning model that is configured to predict the transpilation error for each of the quantum subcircuits in the set of quantum subcircuits.

14. The non-transitory storage medium of claim 13, wherein the predicted transpilation error is compared to a threshold transpilation error, wherein the solution is rejected when the comparison fails, wherein the comparison fails when the predicted transpilation error is greater than the threshold transpilation error.

15. The non-transitory storage medium of claim 14, further comprising deleting the node associated with the solution and children nodes of the node associated with the solution from the tree structure.

16. The non-transitory storage medium of claim 15, further comprising extracting features from the set of quantum subcircuits and inputting the features into the machine learning model.

17. The non-transitory storage medium of claim 13, wherein the query includes an error constraint relating to transpiling the set of quantum subcircuits.

18. The non-transitory storage medium of claim 11, wherein less than all of the nodes in the tree structure are subject to the query.

19. The non-transitory storage medium of claim 11, further comprising performing a backward verification on a parent node of the selected node by performing a query on the parent node.

20. The non-transitory storage medium of claim 11, further comprising, after an operation of pruning the tree is completed, selecting a solution and cutting the quantum circuit according to the solution to generate the quantum subcircuits, wherein finding a solution to the cutting problem is separate and independent of performing a knitting operation after the quantum circuits have been cut and executed at one or more quantum computing systems and wherein pruning is performed separate and independent of other operations to avoid conflicting optimizations.

* * * * *